Figure 1:
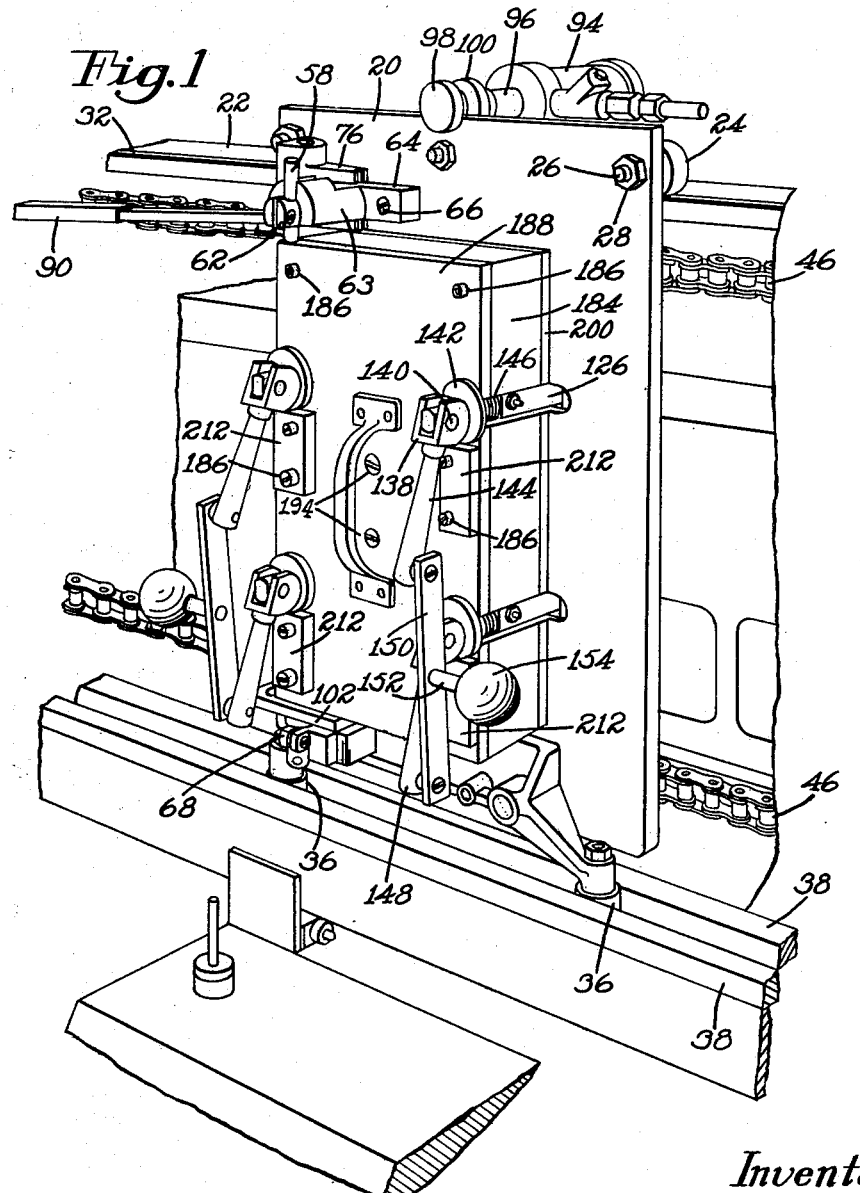

March 9, 1965     P. W. SENFLEBEN     3,172,162
INJECTION SOLE MOLDING MACHINES
Filed Aug. 29, 1962     4 Sheets-Sheet 1

Inventor
Paul W. Senfleben
By his Attorney

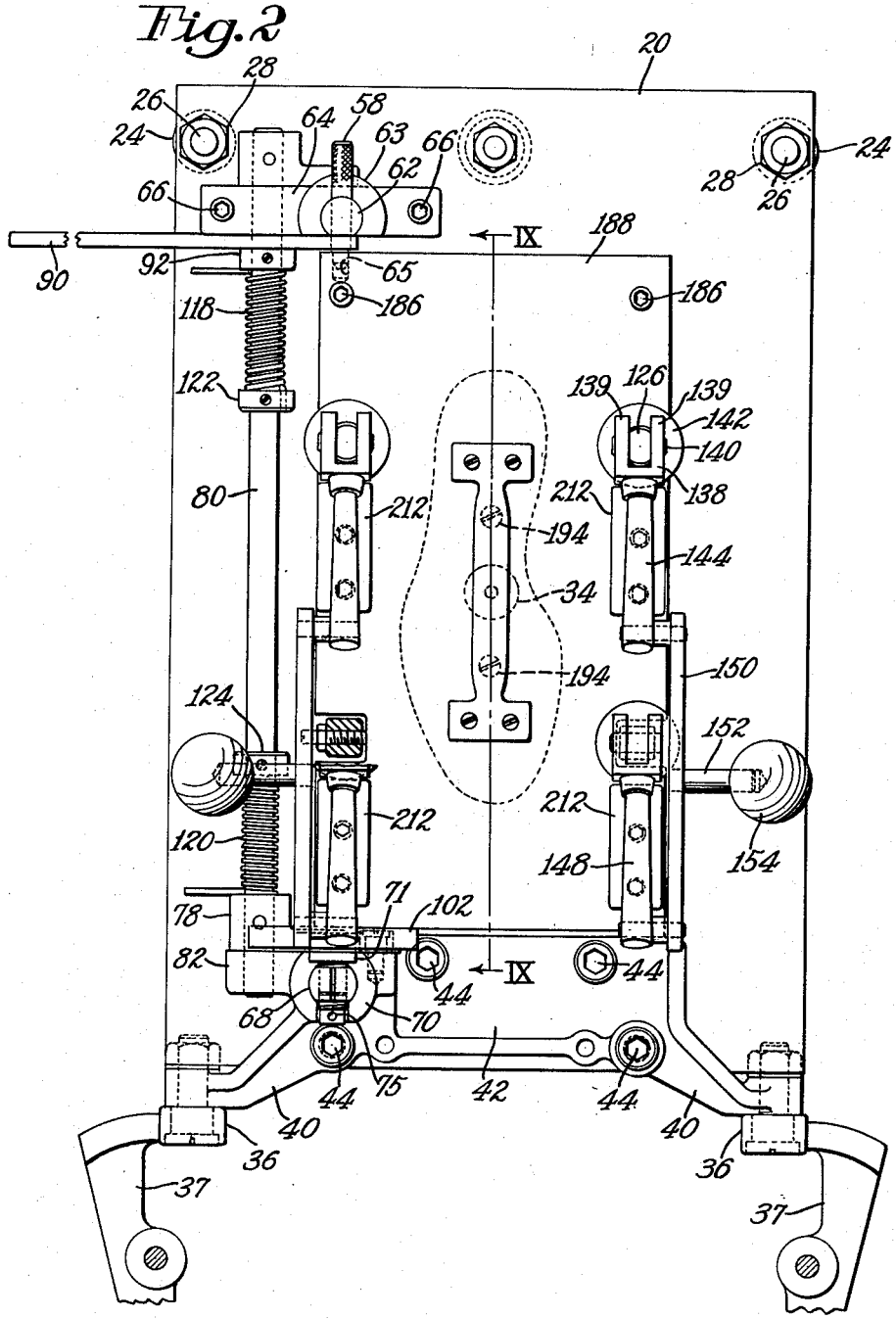

March 9, 1965  P. W. SENFLEBEN  3,172,162
INJECTION SOLE MOLDING MACHINES
Filed Aug. 29, 1962 4 Sheets-Sheet 3
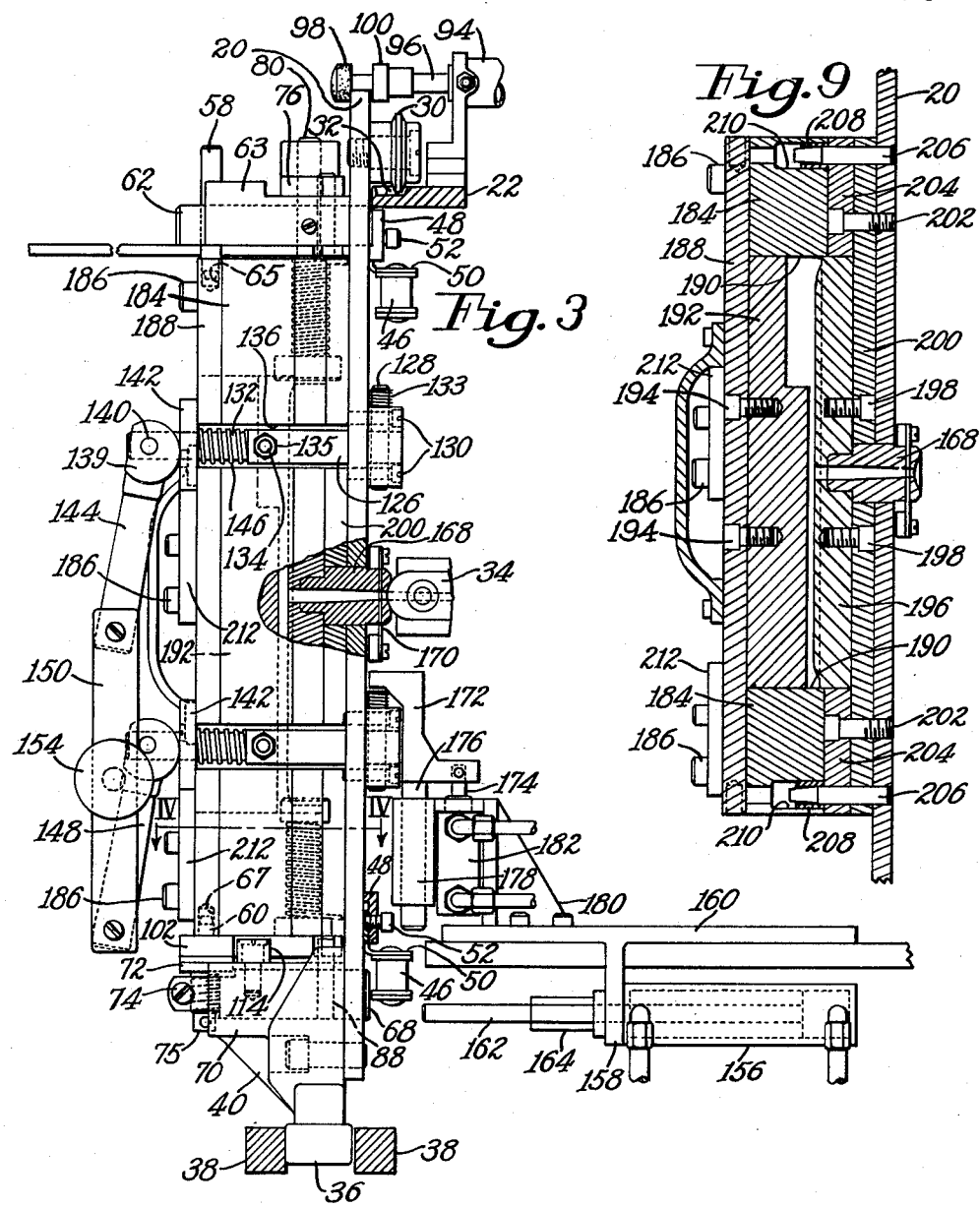

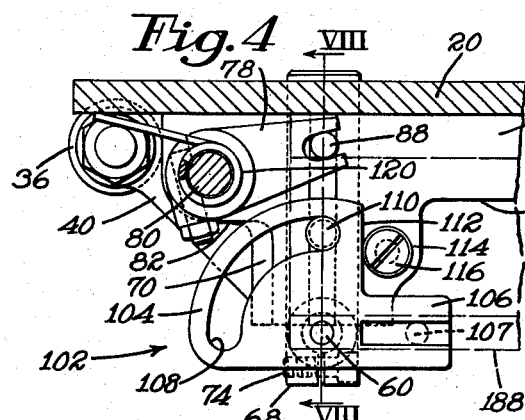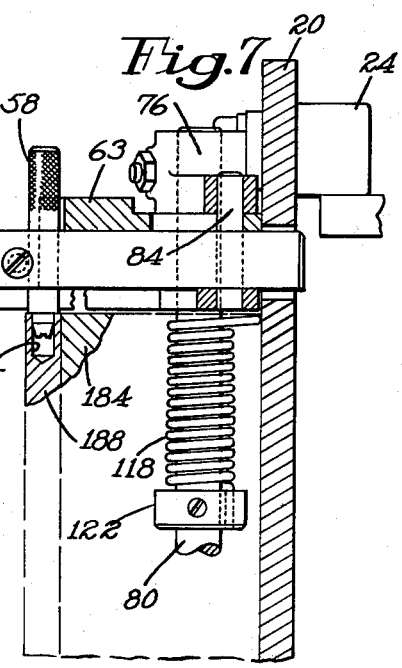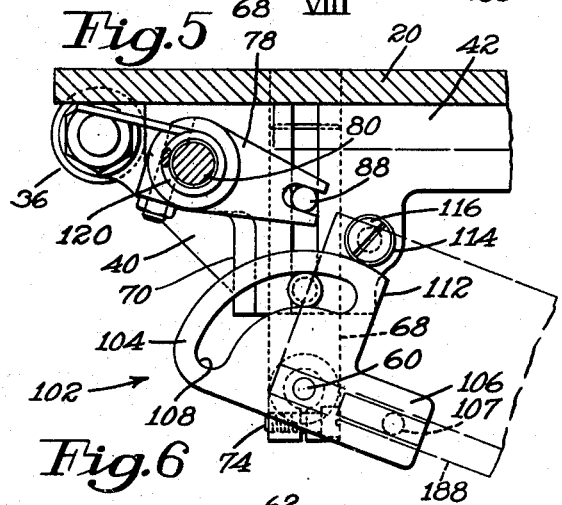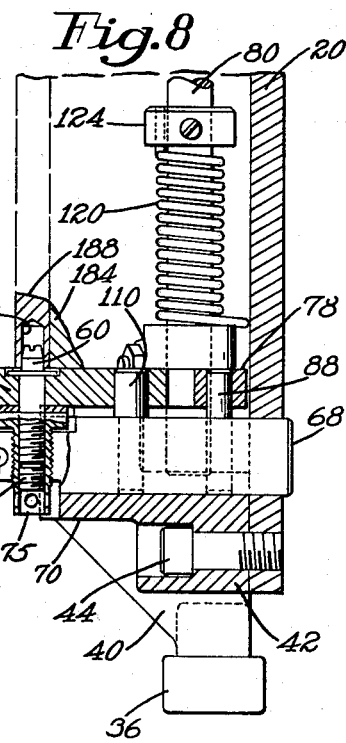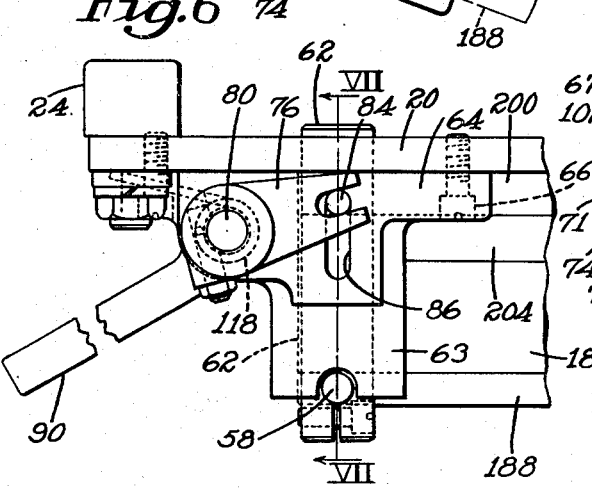

United States Patent Office 3,172,162
Patented Mar. 9, 1965

3,172,162
INJECTION SOLE MOLDING MACHINES
Paul W. Senfleben, Beverly, Mass., assignor to United Shoe Machinery Corporation, Boston, Mass., a corporation of New Jersey
Filed Aug. 29, 1962, Ser. No. 220,178
4 Claims. (Cl. 18—42)

This invention relates to injection molding machines, and is herein illustrated in its application to machines for molding shoe soles or sole and heel units. In its general organization the illustrated machine is similar to a machine disclosed in United States Letters Patent No. 3,006,032, granted October 31, 1961, on an application filed in the names of Baker, Berggren, McIlvin and Spencer. While the invention is herein illustrated in its application to machines for molding shoe soles, it is to be understood that the invention is not limited in scope to machines of this type, but in certain aspects thereof, is applicable generally to injection molding machines.

In general, it is an object of the present invention to provide a machine of the type above referred to suitable for commercial operation and operable at a production rate calculated to make it competitive with machines now in use in the manufacture of shoe soles and sole and heel units.

More specifically, it is an object of the present invention to provide in a machine having a conveyorized mold assembly, an organization which facilitates the mold opening and closing operations and expedites the discharging of the mold.

With the above and other objects in view, as will hereinafter appear, the present invention contemplates the provision in a mold assembly of an upper mold member and a bottom mold member, each having the peripheral contour of an article to be formed in the mold assembly, and novel means for causing mold opening and closing movements of the bottom mold member relatively to the upper mold member. The upper mold member is vertically disposed and attached to a first platen which is secured to a carrier mounted for movement between a mold charging station and a discharging station. The bottom mold member is secured to a second platen which is mounted on the carrier for a movement of translation relatively to the upper mold member to effect a parting of the mold members and for swinging movement on a vertical axis to open the mold into a position convenient for the discharge of the molded article. For mounting the second platen, an upper horizontal shaft and a lower horizontal shaft are mounted for endwise movement in bearing members secured to the carrier and suitable means is provided for hinging the second platen on said upper and lower shafts. In order to provide for equal movements in unison of said upper and lower shafts they are interconnected by a vertical shaft journaled in bearings on the carrier. The arrangement is such that endwise movement of said upper and lower shafts transfers the second platen and the bottom mold member mounted thereon between a mold closing station and an intermediate station. Suitable spring means is provided for rotating the vertical shaft in a direction to actuate said upper and lower shafts to transfer the bottom mold member from its intermediate station to its mold closing station and power operated means is provided in the discharging station for actuating said upper and lower shafts thereby to transfer the second platen and the bottom mold member thereon from the mold closing station to the intermediate station. Concomitantly with the transfer of the bottom mold member the power operated means energizes the spring means which rotates the vertical shaft in a direction to advance the bottom mold member to the mold closing station.

In accordance with a further feature of the invention, there is associated with the bottom mold member, means operated by swinging movement of the mold member while it is located in the intermediate station for holding the upper and lower horizontal shafts against movement in a direction to transfer the bottom mold member from its intermediate station to its mold closing station.

In accordance with another feature of the invention, an outer mold member is secured to the second platen in embracing relation to the bottom mold member and means is provided for holding the second platen against swinging movement during its advancement from the intermediate station to the mold closing station thereby to facilitate telescoping engagement of the outer mold member with the upper mold member.

The invention will now be described with reference to the accompanying drawings and pointed out in the appended claims.

In the drawings:
FIG. 1 is a perspective view illustrating a portion of a machine embodying the features of the present invention;
FIG. 2 is a front elevation of one of a plurality of ambulatory assemblies including the mold parts of the illustrated machine;
FIG. 3 is a right-side elevation of the ambulatory assembly shown in FIG. 2;
FIG. 4 is a sectional view somewhat enlarged taken substantially on the line IV—IV of FIG. 3;
FIG. 5 is a sectional view taken on the same plane as FIG. 4 showing the parts in a different position in the operating cycle;
FIG. 6 is a plan view illustrating the structure shown in FIGS. 4 and 5 with the parts in the position shown in FIG. 4;
FIG. 7 is a section taken substantially on the line VII—VII of FIG. 6;
FIG. 8 is a section taken substantially on the line VIII—VIII of FIG. 4; and
FIG. 9 is a section taken on the line IX—IX of FIG. 2.

The invention is illustrated in the drawings as embodied in a machine of the type illustrated and described in the patent to Baker et al. hereinbefore referred to. Machines of this type have a plastic injecting or mold charging organization and a plurality of ambulatory assemblies each carrying mold parts for molding a shoe sole. Like the machine disclosed in the Baker et al. patent, the illustrated machine is provided with an endless conveyor system on which a plurality of ambulatory assemblies are mounted at uniformly spaced positions. The conveyor system advances the ambulatory assemblies successively into a discharging station in which a molded sole is removed or discharged from the mold assembly and the mold assembly is closed preparatory to another injection or mold charging operation. From the discharging station the ambulatory assembly is advanced in one step to the injection or mold charging station in which the mold cavity is charged with fluid plastic to form a shoe sole. From the mold charging station the ambulatory assembly is advanced in a plurality of steps along the endless path of movement of the conveyor system to the discharging station. Sufficient time elapses during the movement of the ambulatory assembly from the charging station to the discharging station for the curing or solidification of the material in the mold cavity to a degree sufficient to permit the opening of the mold and the removal of the newly molded shoe sole from that mold part in which the sole is retained.

Referring to FIG. 1 which shows an ambulatory assembly in the mold charging station, the illustrated assembly is mounted on a vertically disposed carrier plate 20 which is suspended from an elevated rail 22 by means of two rolls, one of which is illustrated in FIG. 1 and identified by the numeral 24. The roll 24 is freely mounted on the shank portion of a suitable screw 26 secured to the plate by a nut 28. The ambulatory assembly is guided for rectilinear movement on the rail 22 by a roll 30 illustrated in FIG. 3, said roll having a tapered flange which travels in a suitable groove 32 formed in the rail. In the mold charging station the groove 32 is widened to permit limited swinging movement of the ambulatory assembly at right angles to the groove 32 thereby to provide for movement of a mold assembly hereinafter described carried by the plate 20 into mold charging relation to an injection nozzle 34 as shown in FIG. 3. Such movement is imparted to the carrier plate 20 and the mold assembly mounted thereon by the pressure fluid operation of a piston mounted in a cylinder 94 (FIG. 1) secured to the top of the rail 22. The piston rod 96 extends forwardly just above the level of the top edge face of the carrier plate 20 and is provided at its forward extremity with two flanges 98 and 100 which are spaced apart from each other to an extent slightly greater than the thickness of the carrier plate and arranged to engage the carrier plate at opposite sides thereof. The advancement of the ambulatory assembly into the mold charging station causes the operation of an electric switch which causes the operation of the piston in a direction to swing the carrier plate rearwardly thereby to bring the mold assembly into mold charging relation to the injection nozzle. The lower portion of the ambulatory assembly is held against horizontal movement at right angles to its path of travel by two rolls 36, one of which is illustrated in FIG. 3. Each roll 36 is mounted for rotation on a vertical axis and is confined between rails 38 fixed to the machine frame. Referring to FIG. 2, the rolls 36 are mounted at the extremities of downwardly diverging arms 40 formed in a casting 42 secured by screws 44 to the lower portion of the carrier plate 20. An ambulatory assembly in the mold charging station is positioned in its path of movement relatively to the injection nozzle by a pair of levers 37 constructed and arranged to engage the rolls 36. For a description of the construction and operation of the locating levers 37, reference may be had to the Baker et al. patent hereinbefore referred to.

For conveying a plurality of ambulatory assemblies from station to station the illustrated machine is provided with two chains 46 (FIG. 1) vertically spaced from each other and mounted on suitable sprockets (not shown), one pair of sprockets being driven to actuate the chains.

Each ambulatory assembly is removably attached to the chains 46 by plates 48 (FIG. 3) secured to the carrier plate 20. Each plate 48 is recessed to receive the upwardly extending arm of an angle bracket 50 attached to the chain 46. In order to support each chain against downward movement, a headed screw 52 is mounted in the plate 48 and extends through a bore in the angle bracket 50.

Referring to the mold assembly, an outer mold member 184 (FIG. 9) is removably secured by screws 186 to a forward platen 188, said outer mold member having a sole-shaped opening extending therethrough, the wall 190 of which forms all or part of the edge face of the sole. Closely fitted into the opening in the outer mold member is a bottom mold member 192 which is seated upon the inner surface of the platen 188 and removably attached thereto by screws 194. The bottom mold member forms the bottom or tread surface of a sole or a sole and heel unit as the case may be. The mold assembly is completed by an upper mold member 196 having the same peripheral contour as the bottom mold member 192 and shaped to form the upper or foot facing surface of the sole. When the mold assembly is closed as shown in FIG. 9, a portion of the upper mold member is received within the outer mold member 184 in telescoping engagement with the wall 190. The upper mold member is removably attached by screws 198 to a rear platen 200 which is removably attached to the carrier plate 20 by screws 202. The screws 202 extend through a spacer plate 204 and attach it to the platen 200. The spacer plate is substantially thinner than the outer mold member 184 but otherwise is similar in shape to said mold member. The spacer plate serves to determine the extent of penetration of the upper mold member 196 into the cavity defined by the wall 190 of the outer mold member. For accurately determining the registration of the outer mold member 184 relatively to the upper mold member 196, two dowel pins 206 are mounted in alined bores extending through the spacer plate 204, the rear platen 200 and the carrier plate 20. Tapered end portions of the dowel pins projecting forwardly from the spacer plate 204 are received within bushings 208 during the advancement into mold closing position of the assembly comprising the outer mold member 184, the bottom mold member 192 and the forward platen 188. The bushings 208 are tightly fitted into suitable counterbores 210 formed in the outer mold member 184.

The platen 188 is mounted for swinging movement on a vertical axis from an open position into an intermediate position in which the swinging assembly is parallel to but spaced outwardly from the platen 200. To provide for such swinging movement of the platen 188 and the mold elements attached thereto, an upper hinge pin 58 (FIG. 7) is arranged to extend downwardly into a socket 65 formed in the platen 188 at a point adjacent to its left edge face and a lower hinge pin 60 (FIG. 8) is arranged to extend upwardly through a plate 102 hereinafter described and into a socket 67 (FIG. 8) formed in the lower portion of the platen 188 at a point in axial alinement with the socket 65. The upper hinge pin 58 is fixed in a short horizontal shaft 62 mounted for sliding movement in a suitable bore in a cylindrical forward extension 63 of a casting 64 (FIG. 2) secured by screws 66 to the carrier plate 20. Referring to FIG. 8, the lower portion of the hinge pin 60 is threaded for engagement in a tapped axial bore formed in a headed screw 71 of large diameter and a set screw 73 mounted in the tapped bore secures the hinge pin 60 in adjusted position relatively to the screw 71. The screw 71 is mounted in a tapped bore in the forward portion of a shaft 68 mounted in a horizontal bore formed in the casting 42 and extending through a cylindrical forward extension 70 thereof. At its lower end the screw 71 has a capstan head 75 whereby the screw may be rotated to effect a micro-adjustment of the swinging assembly vertically relatively to the carrier plate 20. To provide for the clamping of the screw 71 in its adjusted position the forward extremity of the shaft 68 is divided vertically into two sections to provide a split clamp structure and a suitable clamping screw 74 is provided for closing the split clamp structure on the screw. The opening of the mold is effected by a rectilinear forward movement of the platen 188 followed by a hinging movement on the pins 58 and 60. Rectilinear forward movement is achieved by endwise movement in unison of the two shafts 62 and 68. To provide for such movement of the shafts two forked arms 76 and 78 are secured respectively to the upper and lower portions of a vertical shaft 80 mounted for rotation in suitable bearings in the casting 64 and in an extension 82 (FIG. 2) of the casting 42. Referring to FIG. 6, the upper forked arm 76 engages a pin 84 mounted in the shaft 62 and projecting upwardly therefrom through a longitudinal slot 86 formed in the casting 64. The end walls of the slot 86 determine the limits of movement of the shaft 62. By the same token the end walls of the slot limit the rotary movement of the shaft 80 and it will be understood from the following description that such limitation of the rotary movement of the shaft determines the limits of movement of the lower shaft 68. The lower forked arm 78, as shown in FIG. 4, engages a pin 88 projecting upwardly from the shaft 68 through a suitable opening in the casting 42. The forked arms 76 and 78 are fast on the shaft 80 and the shaft is manually rotated by a hand lever 90 (FIG. 2) freely mounted on the shaft between the base of the casting 64 and a collar 92 fixed to the shaft. The right end portion of the hand lever is bifurcated for engagement with that portion of the pin 84 extending downwardly from the shaft 62, the lower portion of the cylindrical extension 63 of the casting being slabbed off to provide clearance for the bifurcated end portion of the hand lever. Swinging movement of the hand lever 90 in a clockwise direction, as seen in FIG. 6, causes a movement of separation of the outer mold member 184 and the spacer plate 204 from their positions shown in FIG. 9. During such movement of separation the platen 188 is held against angular movement relatively to the platen 200 by mechanism now to be described. Referring to FIGS. 4 and 5, the platen 188 has secured to its lower end wall at its left end portion a horizontal plate 102 comprising a quadrant 104 and a rectangular extension 106 having a front edge common to the front edge of the quadrant. As shown in FIG. 4, the plate 102 is arranged with the common edge of the quadrant and the extension 106 parallel to and spaced forwardly from the base of the platen 188 and the axis of curvature of the arcuate edge face of the quadrant concentric to the hinge pin 60, said hinge pin, as shown in FIG. 8, extending through a bore in the plate. The plate 102 is held against angular movement relatively to the platen 188 by a pin 107 (FIG. 4) extending through the extension 106 and into the base portion of the platen. Formed in the plate 102 is a concentric slot 108 in which is located the head of a pin 110 mounted in and projecting upwardly from the shaft 68. When the platen 188 is in mold closing relation to the platen 200, as shown in FIG. 6, an edge face 112 (FIG. 4) of the plate 102 is perpendicular to the carrier plate 20 and bears against a roll 114 freely mounted on a headed screw 116 projecting upwardly from the casting 42. The rear end wall of the slot 108 is so located that when the platen 188 is in its position illustrated in FIG. 4 the pin 110 bears against said end wall and prevents angular movement of the platen in a counterclockwise direction during the forward movement of the platen 188 while the roll 114, bearing against the edge face 112, prevents angular movement of the platen 188 in a clockwise direction. Upon the completion of the rectilinear movement of the platen 188 the arcuate edge face of the plate 102 comes into tangential relation to the periphery of the roll 114 and the platen 188 is free to swing within the limits afforded by the length of the slot 108. Upon the return of the platen from an open position to a position in which it is parallel to the platen 200, two torsion springs 118 and 120 (FIGS. 7 and 8) rotate the shaft 80 in a counterclockwise direction as seen in FIG. 5 to return the platen 188 to its position illustrated in FIG. 4 in which it is in mold closing relation to the carrier plate. As shown in FIGS. 6 and 7, the torsion spring 118 surrounds the shaft 80 and is confined between a collar 122 fixed to the shaft and the bottom of the hand lever 90. The lower end of the spring is bent downwardly and inserted into a bore in the collar and the upper end is extended horizontally for engagement with the front face of the carrier plate 20. Similarly the torsion spring 120 surrounds the lower portion of the shaft 80 and is confined between a collar 124 fixed to the shaft and the hub of the arm 78. The upper end portion of the spring is bent upwardly and inserted into a bore in the collar 124 and the lower end portion is extended horizontally for engagement with the front face of the carrier 20.

For clamping the outer mold member 184 against the spacer plate 204 thereby to hold the mold parts in their closed position illustrated in FIG. 9 during the mold charging operation the illustrated machine is provided with four duplicate clamping assemblies, two of which are illustrated in FIG. 3. Referring to the uppermost of the two clamping assemblies illustrated in FIG. 3, a clamping arm 126 comprising a rear portion square in cross section and a cylindrical forward portion 132 is inserted through a suitable aperture in the carrier plate 20 and fixed to a vertical pin 128 pivotally mounted in the parallel horizontal arms of a bracket 130 secured to the rear surface of the carrier plate. The clamping arm is normally held outwardly swung, away from the mold assembly, by a torsion spring 133 surrounding the upper portion of the pin 128 and having its upper extremity inserted into a diametrical bore in the pin and its lower end portion extended for engagement with the back of the carrier plate. The clamping arm is manually movable inwardly against the force of the spring 133 into its clamping position illustrated in FIG. 3 in which it is located in a groove 136 formed in the edge of the outer mold member 184 and in a notch in the platen 188 forming a continuation of the groove 136. The disposition of the clamping arm in its clamping position is critical and in the illustrated organization is determined by a headless screw 134 adjustably mounted in the arm 126 for engagement with the base of the groove 136, a suitable lock nut 135 being provided for securing the screw in adjusted position. Referring to FIG. 2, a clamping yoke 138 embraces the slabbed off forward extremity of the clamping arm 126 and is pivotally mounted on a cross pin 140 carried by the clamping arm and extending eccentrically through the discoidal arms 139 (FIG. 3) of the yoke. The clamping action is effected by the rotation of the eccentric arms 139 against a washer 142 freely mounted on the arm 126. Secured to the cross bar of the yoke 138 is an arm 144 which is so arranged that downward movement thereof from a horizontal position into its downwardly extending position illustrated in FIG. 3 causes the eccentric arms 139 to clamp the swinging assembly against the platen 188. Upon return of the arm 144 to a horizontal position a spring 146 surrounding the cylindrical portion 132 of the clamping arm moves the washer 142 forwardly away from the platen 188 to facilitate swinging movement of the clamping assembly away from the platen in order to provide clearance for the forward movement of the platen 188. For concomitantly operating the upper clamp and the lower clamp illustrated in FIG. 3 the arm 144 and the corresponding arm 148 in the lower clamping assembly are connected together at their outer ends by a vertical link 150. Referring to FIG. 2, a pin 152 is fixed in the central portion of the link and extends outwardly therefrom and carries at its outer end a spherical knob 154 whereby the operator may conveniently manipulate the upper and lower clamping assemblies in unison. The mechanism for applying clamping pressure to the left side portion of the platen 188 is generally similar to the clamping mechanism provided at the right side of the platen. Its construction and operation will be understood from the foregoing description. Each washer 142 is positioned vertically for the clamping operation by a plate 212 (FIG. 1) secured to the forward platen 188. The plate supports the washer against downward movement and so positions it that it is disposed with its rear face parallel to the forward face of the platen 188 as it is advanced into clamping position.

To provide for the forward movement of the platen 188 and the mold parts mounted thereon after the clamping means has been released and swung outwardly away from the platen and the mold assembly, the illustrated machine is provided with a pressure fluid operated piston mounted in a cylinder 156 (FIG. 3) secured to an arm 158 extending downwardly from a fixed plate 160. An elongated rod 162 extends forwardly from the piston through a bore in the arm 158 and through a sleeve 164 secured to the arm and providing a bearing for the rod. The piston rod is arranged in alinement with the shaft 68 and forward movement of the rod from its retracted position illustrated in FIG. 3 moves the shaft 68 forwardly. It will be understood that forward movement of the shaft 68 causes the shaft 80 to rotate and, through connections above described, causes the shaft 62 above the mold assembly to move forwardly in unison with the shaft 68. The piston is advanced with sufficient force to cause an accelerating forward movement of the platen 188 and the mold parts thereon such that the momentum developed causes the platen to swing upon its pivot pins 58 and 60 after the shafts 62 and 68 come to the limit of their forward movement determined by the engagement of the pin 84 (FIG. 6) with the forward end wall of the slot 86. The piston and cylinder assembly 156 are located in the discharging station of the machine. In the illustrated organization a manually operated switch (not shown) is provided for causing the operation of the piston. In relieving the operator of the manual operation of opening the mold assembly the piston and cylinder assembly 156 serves to expedite the mold discharging operation and thus to increase the productive capacity of the machine.

In the mold charging operation a charge of fluid material is injected from the nozzle 34 through a suitable sprue passage in a barrel 168 fixed in the carrier plate 20 and arranged to communicate with the upper mold member. In order to prevent evacuation of fluid from the mold cavity after the barrel 168 has been disengaged from the nozzle 34 a suitable gate valve is provided in that portion of the barrel 168 projecting rearwardly from the carrier plate 20. The gate valve is herein illustrated as a flat plate 170 having an aperture which registers with the sprue passage during the mold charging operation. The gate valve is mounted in a suitable opening extending diametrically vertically through the barrel 168, the dimensions of the opening being such that the valve is readily movable through it but is nevertheless held by friction in its adjusted position. For closing the valve after the completion of a mold charging operation there is provided in the mold charging station a valve lifter 172 herein illustrated as a vertical plate having at its upper end a forward extension arranged to engage the lower extremity of the gate valve and having at its lower extremity a rearward extension to which the upwardly extending rod 174 of a piston is connected. For guiding the valve lifter for rectilinear vertical movement a stem 176 extends downwardly from the lower extremity of the valve lifter through a vertical barrel 178 formed in the forward portion of a fixed bracket 180. Also formed in the bracket is a cylinder 182 in which operates the piston to which the rod 174 is connected. It will be understood that upward movement of the gate valve by the lifter 172 transfers the aperture in the gate valve from a position of registration with the sprue passage and the nozzle opening into an upwardly offset or closed position. The gate valve remains closed during the travel of the ambulatory assembly from the mold charging station through the endless path of travel of the conveyor assembly to the mold discharging station. An inversion of the valve lifting mechanism above described is provided in the mold discharging station for moving the gate valve downwardly into an open position.

In the operation of the illustrated machine an ambulatory assembly, in which the swinging mold assembly is closed and clamped as shown in FIG. 1, advances into the mold charging station with the gate valve 170 (FIG. 3) in its open position preparatory to the mold charging operation. The levers 37 position the ambulatory assembly in its path of travel relatively to the injection nozzle 34 whereupon the piston in the cylinder 94 (FIG. 1) is operated to swing the ambulatory assembly rearwardly to bring the barrel 168 into mating engagement with the injection nozzle 34 as shown in FIG. 3. Upon completion of the mold charging operation, and while the barrel 168 remains in mating engagement with the injection nozzle, the valve lifter 172 operates to close the gate valve whereupon the piston in the cylinder 94 (FIG. 1) swings the ambulatory assembly forwardly preparatory to the resumption of the operation of the conveyor. The ambulatory assembly then advances through a plurality of idle stations while the charge in the mold cavity sets sufficiently to permit removal thereof from the mold cavity. When the ambulatory assembly reaches the discharging station a valve depressor, similar in its construction and operation to the valve lifter 172, shifts the gate valve 170 downwardly into its position shown in FIG. 3 thereby opening the valve for the next mold charging operation. While the assembly remains in the discharging station the mold clamping assemblies are released and swung outwardly to permit the platen 188 and the mold members attached thereto to move forwardly to effect the mold parting operation. This operation is initiated by the manual closing of a switch which initiates the operation of the piston 162 which imparts forward movement to the shaft 68 to effect the mold parting operation. The shaft 68 is moved with sufficient velocity to cause the platen 188 and the molds thereon to swing open by their own momentum after the shaft 68 and its companion shaft 62 come to the limit of their forward movement. The molded sole and heel unit which is carried forwardly with the outer mold member 84 is now discharged from the mold cavity in any convenient manner whereupon the swinging assembly is advanced into mold closing position and secured by the clamping assemblies. The ambulatory assembly then advances into the mold charging station for a repetition of the cycle.

Having thus described my invention, what I claim as new and desire to secure by Letters Patent of the United States is:

1. In combination, an upper mold member, a first platen to which said member is attached, a bottom mold member, a second platen to which the bottom mold member is attached, an upper horizontal shaft and a lower horizontal shaft, a carrier for the first platen, members fixed to the carrier and arranged to mount the shafts respectively for endwise movement perpendicular to the first platen, means for hinging the second platen on the shafts, a manually operated member for causing equal movement of the shafts in unison endwise thereof in one direction to effect a parting movement of the mold members, and springs for causing equal movement of said shafts in unison endwise thereof in the opposite direction to advance the second platen into mold closing position.

2. In combination, a vertically disposed upper mold member, a first platen to which said member is attached, a vertically disposed bottom mold member, a second platen to which the bottom mold member is attached, a carrier to which the first platen is secured, means mounting the carrier for movement between a mold charging station and a discharging station, means for centering the carrier in the mold charging station, an upper horizontal shaft and a lower horizontal shaft, bearing members for said upper and lower shafts respectively, said bearing members being mounted on the carrier, means for hinging the second platen on said upper and lower shafts, a vertical shaft mounted in bearings on the carrier, means whereby said vertical shaft imparts equal movement in unison to the upper and lower shafts, the arrangement being such that endwise movement of said upper and lower shafts transfers the bottom mold member between a mold closing station and an intermediate station, spring means for rotating said vertical shaft in a direction to move said upper and lower shafts endwise to transfer the bottom mold member from its intermediate station to its mold closing station and power operated means in the discharging station for causing endwise movement of said upper and lower shafts in a direction to transfer said bottom mold member from its mold closing station to its intermediate station and concomitantly to energize said spring means.

3. The combination according to claim 2, characterized by means operated by swinging movement of the bottom mold member while it is located in the intermediate station for holding the upper and lower horizontal shafts against movement in a direction to transfer the bottom mold member from its intermediate station to its mold closing station.

4. The combination according to claim 2, characterized by an outer mold member secured to the second platen in embracing relation to the bottom mold member and means for holding the second platen against swinging movement during its advancement from the intermediate station to the mold closing station whereby such advancement of the second platen causes telescoping engagement of the outer mold member with the upper mold member.

References Cited in the file of this patent

UNITED STATES PATENTS

| | | |
|---|---|---|
| 1,343,425 | Whisler | June 15, 1920 |
| 1,396,158 | Bonner | Nov. 8, 1921 |
| 1,459,872 | Belk | June 26, 1923 |
| 1,947,335 | De Mattia | Feb. 13, 1934 |
| 2,092,410 | Wheeler | Sept. 7, 1937 |
| 2,145,653 | Hall et al. | Jan. 31, 1939 |
| 2,358,341 | Malm | Sept. 19, 1944 |
| 2,428,664 | Gregg | Oct. 7, 1947 |
| 2,937,405 | Berggren et al. | May 24, 1960 |
| 3,006,032 | Baker et al. | Oct. 31, 1961 |
| 3,060,506 | Uschmann | Oct. 30, 1962 |